United States Patent [19]

Kotthaus

[11] 3,760,476
[45] Sept. 25, 1973

[54] END CUTTER HEAD
[75] Inventor: Erich Kotthaus, Kloten, Switzerland
[73] Assignee: Werkzeugmaschinenfabrik Oberlikon-Buhrle AG, Zurich, Switzerland
[22] Filed: Feb. 8, 1972
[21] Appl. No.: 224,486

[30] Foreign Application Priority Data
Feb. 12, 1971  Switzerland.......................... 2135/71

[52] U.S. Cl............................................. 29/105 A
[51] Int. Cl. ................................................. B26d
[58] Field of Search ..................... 29/103 C, 105 R, 29/105.1

[56] References Cited
UNITED STATES PATENTS
1,650,290   11/1927   Metzger.............................. 29/105.1

Primary Examiner—Andrew R. Juhasz
Assistant Examiner—William R. Briggs

[57] ABSTRACT

An end cutter head, e.g. for gear cutting machines, comprising bar tool bits two of which are located together in a common tool receiving slot of the cutter head, and a spacing shim interposed in the cutting direction between the said two bar tool bits.

1 Claim, 3 Drawing Figures

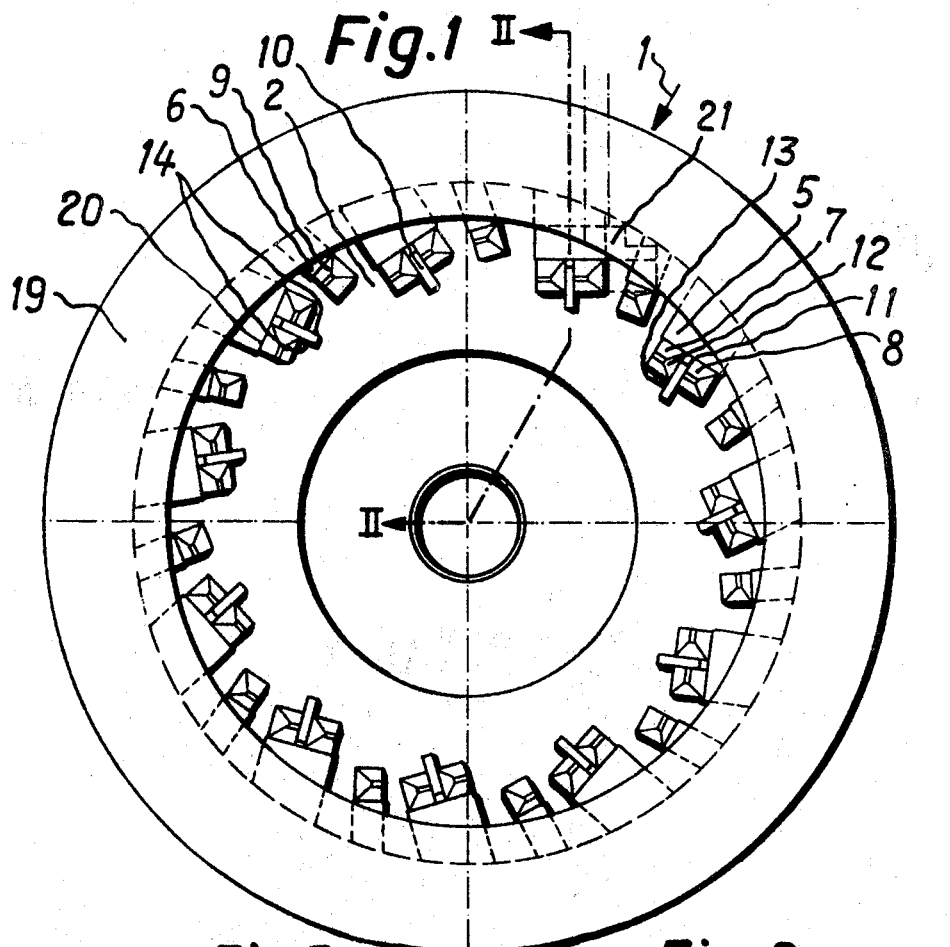
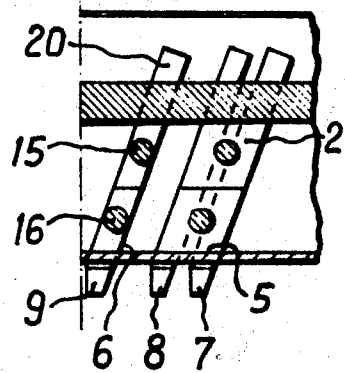
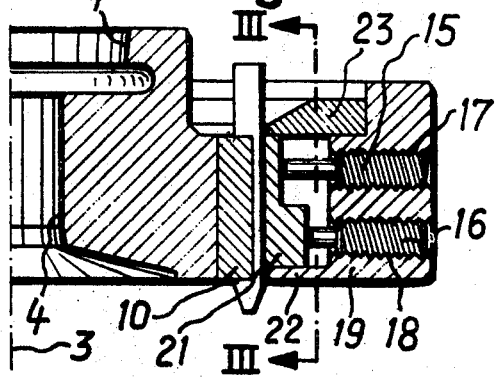

END CUTTER HEAD

BACKGROUND OF THE INVENTION

The present invention relates to an end cutter head, e.g. for gear cutting machines, fitted with bar tool bits of which two each are together located in a common slot in the cutter head.

A bar tool bit is understood to be a bit in which the side faces and top face together with the cutting face form the cutting edge, and in which the cutting edge shifts in the shank axis when the faces are reground. There has previously been proposed an end cutter head in which receiving slots inclined to the cutter head axis and extending in tangential planes each contain directly contacting tool bits. This known arrangement has the advantage that a relatively large number of bits can be accommodated on a cutter head of given diameter and its cutting performance thus raised. However, it has been found that in this prior art end cutter head the peeling chip which runs over the cutting face of the next following bit may become jammed in the tight intervening space between the back of the leading bit and the cutting face of the following bit and thereby prevent the cutter head from working as is desired.

SUMMARY OF THE INVENTION

It is an object of the present invention to eliminate this drawback. According to the present invention there is provided an end cutter head, e.g. for gear cutting machines, comprising bar tool bits, two of which are located together in a common tool receiving slot of the cutter head, and a spacing shim interposed in the cutting direction between the two bar tool bits.

BRIEF DESCRIPTION OF THE DRAWINGS

The invention will be more particularly hereunder described with reference to an embodiment shown in FIGS. 1 to 3 of the accompanying drawing in which:

FIG. 1 is a plan view of an end cutter head according to the invention;

FIG. 2 is a section taken on II—II in FIG. 1, and

FIG. 3 is a section taken on III—III in FIG. 2.

DETAILED DESCRIPTION OF THE INVENTION

Referring to FIGS. 1 to 3 an end cutter head 1 comprises a disc-shaped body 2. This body 2 has a central bore 4 concentric with the axis 3 of the cutter head for fitting the body to the driving spindle, not shown, of a gear cutting machine. The disc-shaped body 2 is provided around its periphery with slots 5 and 6 for the reception of bar tool bits 7, 8 and 9. The slots 5, 6 extend in tangential planes of the disc-shaped body 2 and they make an angle with the axis 3 of the cutter head as will be understood more particularly by reference to FIG. 3. One of the two slots 5 and 6, for instance slot 5, is designed to receive two bits 7 and 8, whereas the other slot 6 contains only a single bit 9. The three bar tool bits 7, 8 and 9 form an associated group of tools for cutting one tooth of a gear, the bits 7, 8 and 9 functioning in succession as a roughing tool, an outside-cut tool and an inside-cut tool. The direction of rotation in operation of the cutter head 1 in FIG. 1 would be anti-clockwise.

Interposed between the two tool bits 7 and 8 which share a common slot 5 is a spacing shim 10. This shim 10 provides sufficient spacing between the face 11 of the tool bit 8 and the back 12 of the preceding tool bit 7. The shim 10 fits into a slot 13 which is centrally symmetrical in relation to the main receiving slot 5.

The shim 10 is secured to the disc-shaped base 2 by a spot weld 14 and projects resiliently into the main slot 5. When the bar tool bits 7, 8 shift in the direction of their shank axis the shim 10 does not participate in this movement.

For securing the bar tool bits 7, 8, 9 in their slots 5 and 6 set screws 15, 16 are provided. The set screws 15, 16 work in tapped holes 17, 18 of a clamping ring 19. The clamping ring 19 is attached to the disc-shaped base 2, in a manner not shown, so that no rotation between the base 2 and the clamping ring 19 can take place. The axis of the set screws 15, 16 and hence of the tapped holes 17, 18 are normal to the faces 20 of the tool shanks. A thrust member 21 is interposed between the screw ends and the bar tool bits and bears against the faces 20 of the tool shanks. The thrust member 21 is secured against axial displacement in either direction by being located between a flange collar 22 of the clamping ring 19 and a ring holder 23 attached to the clamping ring 19 in a manner not illustrated.

The above-described end cutter head is merely one embodiment of the invention. For instance, each group of bits might comprise only two bits, namely an outside-cut and an inside-cut bit mounted as a pair in the wide slot 5. In such a case the narrower slot 6 would not be needed.

I claim:

1. An end cutter head, e.g. for gear cutting machines, said head comprising:
   a disc-shaped body having tool receiving slots therein;
   bar tool blades, two of which are positioned together in one of said tool receiving slots of said end cutter head; and
   spacing shims interposed in the cutting direction between the said two bar tool blades, said spacing shims being secured by a spot weld in a further slot situated symmetrically with respect to said tool receiving slot and projecting resiliently into said tool receiving tool receiving slot and projecting resiliently into said tool receiving slot.

* * * * *